United States Patent [19]

Gauvin et al.

[11] Patent Number: 4,466,824

[45] Date of Patent: Aug. 21, 1984

[54] TRANSFERRED-ARC PLASMA REACTOR FOR CHEMICAL AND METALLURGICAL APPLICATIONS

[75] Inventors: William H. Gauvin, Beaconsfield; George R. Kubanek, Baie d'Urfé, both of Canada

[73] Assignee: Noranda Mines Limited, Toronto, Canada

[21] Appl. No.: 382,415

[22] Filed: May 26, 1982

[30] Foreign Application Priority Data

Jul. 30, 1981 [CA] Canada .................................. 382889

[51] Int. Cl.³ .............................................. C22B 4/00
[52] U.S. Cl. ..................................... 75/10 R; 75/11; 75/12
[58] Field of Search ..................................... 75/10–12, 75/65 EB

[56] References Cited

U.S. PATENT DOCUMENTS

| 3,856,918 | 12/1974 | Skrivan et al. | 423/69 |
| 3,932,171 | 1/1976 | Tylko | 75/10 R |
| 4,002,466 | 1/1977 | MacRae et al. | 75/11 |
| 4,154,972 | 5/1979 | Tylko | 13/2 P |
| 4,234,334 | 11/1980 | MacRae et al. | 75/10 R |

FOREIGN PATENT DOCUMENTS 1065794 11/1979 Canada .

OTHER PUBLICATIONS

Fauchais, "Utilisation Industrielle Actuelle et Potentielle des Plasmas: Syntheses, Traitement des Poudres, Traitements Metallurgiques, Traitements de Surface", Laboratoire de Thermodynamique, Universite de Limoges, France, May 6, 1980.
Munz et al., "The Decomposition Kinetics of Molybdenite in an Argon Plasma", AIChE Journal, No. 6, vol. 21, Nov. 1975.
Kubanek et al., "Plasma Decomposition of Molybdenum Disulphide—A Progress Report", Third Int'l Symposium on Plasma Chemistry, University of Limoges, France, Jul. 13-19, 1977.
MacRae et al., "Ferrovanadium Production by Plasma Carbothermic Reduction of Vanadium Oxide", Homer Research Laboratories, Dec. 1976.
Biceroglu et al., "Chlorination Kinetics of Zirconia in an RF Chlorine Plasma Tail Flame", AIChE Journal, vol. 26, No. 5, Sep. 1980, pp. 734–744.
Gauvin et al., "The Plasma Production of Ferromolybdenum–Process Development and Economics", Journal of Metals, vol. 33, No. 1, Jan. 1981, pp. 42–46.

Primary Examiner—Peter D. Rosenberg
Attorney, Agent, or Firm—Fleit, Jacobson, Cohn & Price

[57] ABSTRACT

A transferred-arc plasma reactor is disclosed. The reactor comprises a bottom portion defining a crucible for collecting molten material, an anode adapted to contact the molten material in the crucible, a sleeve mounted on top of the crucible and electrically insulated therefrom, a cathode assembly including a cathode mounted on top of the sleeve and electrically insulated therefrom, means for introducing feed material conveyed by a carrier gas near the top of the sleeve so that the material is fed against the inner wall of the sleeve, melted under the heating energy radiated by a plasma arc formed between the cathode and the molten material to form a falling film of molten material which flows down along the inner wall of the sleeve and drops into the crucible underneath, and outlet ports in the bottom portion of the reactor for exiting the carrier gas and the non-reacted plasma forming gas.

10 Claims, 5 Drawing Figures

TRANSFERRED-ARC PLASMA REACTOR FOR CHEMICAL AND METALLURGICAL APPLICATIONS

This invention relates to a transferred-arc plasma reactor for chemical and metallurgical applications.

The application of plasma technology to chemical and metallurgical processes has been receiving increasing attention for the past two decades. For the purpose of the following description, a plasma may be defined as a gaseous mixture of dissociated molecules, atoms, ions and electrons at very high temperatures. The degree of ionization into ions and electrons depends on the species of the gas and on its temperature. For the purpose of industrial applications, the temperature of a plasma ranges from about 6 000 K. to 25 000 K.

The principal objective in generating and using a plasma is to create an environment at very high temperature. Not only does this high temperature environment permit greatly increased rates of reaction in most processes of industrial interest, but it frequently allows reactions to occur which would not be feasible at the lower temperature levels obtainable by conventional methods, for example, combustion flames or oxyacetylene flames. A good example of this is the thermal decomposition of molybdenum disulphide, $MoS_2$, which is found in nature as molybdenite, at temperatures up to 2 900 K. to yield molybdenum metal directly, with evolution of vapours of elemental sulphur, which can be condensed separately into solid sulphur, thus eliminating pollution problems. In addition, the plasma-forming gas can often be used as a reactant, for example, for oxidation (oxygen and/or air), reduction (carbon monoxide, hydrogen or natural gas), chlorination (chlorine), or nitriding reactions (nitrogen).

For practical purposes, the best method of generating a plasma is by means of a direct-current electric arc struck between two electrodes (the cathode and the anode) or by means of electrodeless radio frequency induction or capacitance.

From an industrial point of view, to be technically and economically viable, a plasma system must meet the following constraints:

1. The system must be highly energy efficient. This is probably the most important limitation imposed on the plasma system, owing to the generally higher cost of electrical energy, when compared with conventional fuels, such as coal, oil and natural gas. In general, only when such conventional fuels prove unable to create the desired high temperature environment economically should a plasma application be considered.

2. Product purity specifications should be met. Many products of metallurgical or chemical processing reactions must meet stringent purity specifications. In these cases, the conversion rate of the reactants to yield the desired product must be nearly 100%. It also means that little or no contaminants can be introduced in the system, either from the materials of construction of the equipment, or from the ingress into the system of air or other gaseous contaminants.

3. The physical form of the product must be industrially acceptable. Some types of plasma generators are limited to the formation of solid products in a finely divided form. Since products in that form find limited use in metallurgical processes (e.g., powder metallurgy), plasma systems capable of yielding a product in a molten form which can then be cast as ingots should be preferred, since the latter can be more easily transformed into the desired final shapes.

4. Capital and operating costs should be reasonable. The plasma system should be simple and not require extensive feed preparation or extensive effluent treatment. Operation should be continuous or near continuous and susceptible of complete automation. On-stream operation should be high with low requirements for maintenance. The life of the electrodes should be reasonable and replacement should require a minimum of time.

5. Working and environmental conditions should be of a high standard. The working environment of a plasma system should be relatively free from noise and heat stress, and from toxic fumes and dust. The gaseous effluents emanating from the plasma system should be susceptible of treatment to recover and recycle the dust, to recover its useful heat and to eliminate chemical pollutants.

Many devices have been developed to produce plasmas by means of electric arcs. Of these, the most common are the dc jet arc, in which the plasma-forming gas is blown between a cathode and a water-cooled anode in close proximity. The plasma emerges from the nozzle in the form of an expanding jet or tail-flame at very high velocity. Another common form is the radio frequency induction plasma generator, in which an outside electrical field couples with the magnetic field inside the generator, thereby creating a fireball at elevated temperatures. The plasma issues from a nozzle in the form of an expanding jet but typically at lower temperatures and velocities than in the dc jet generator. Among non-jet types, large volume and low velocity plasmas can be generated between three electrodes connected to a 3-phase alternating current circuit, with a pilot arc for starting. Finally, during recent years, the transferred arc has received increased attention for the production of ceramics and for metallurgical operations. In this type of plasma generator, a very long dc arc ranging from a few centimeters to a meter or upward, is struck between a cathode and an anode consisting of the molten desired product. The arc takes the form of a column of plasma gas at high temperature. The temperature is highest near the tip of the cathode and decays slowly as the anode is approached. The temperature near the cathode is typically close to 20 000 K. for argon and depends to a certain extent on the nature of the plasma forming gas and other operating conditions.

The scientific and patent literature on plasma devices and their applications is quite extensive. To date, most of the research in this field has been devoted to exploring the technical feasibility of effecting the desired reactions under plasma conditions, rather than optimizing and controlling the plasma system so as to make it economically viable. The latter is a consideration of the highest importance, in view of the high cost of electrical energy. As a consequence, and although plasma generators capable of continuous operation at a power of several megawatts are commercially available, the use of plasma reactors on a commercial scale is limited to a few processes: the production of acetylene, that of titanium oxide, the dissociation of zircon sand, smelting operations in steel making and the melting of specialty steels. The use of plasma for high temperature heterogeneous systems has recently been thoroughly reviewed in an article entitled "Utilisation Industrielle Actuelle et Potentielle des Plasmas" by P. Fauchais (published in Revue Phys. Appl. Volume 15, starting page 1281, 1980).

In a search for new processes for the production of ferroalloys from their concentrates (for example, ferrochrome, ferromolybdenum, ferrovanadium, ferroniobium (also known as ferrocolumbium), etc.) which would be less expensive and less polluting than existing conventional methods, it was believed that plasma systems might offer some advantages. For example, the current technology for the production of ferromolybdenum involves the roasting of the concentrate of $MoS_2$ to produce a technical grade of $MoO_3$, with the attendant production of large quantities of $SO_2$ gas which must be scrubbed out or converted to sulphuric acid. The oxide is then reacted with ferrosilicon and aluminum in the presence of iron in a batch process where the mixture is charged into a shallow pit of bricks and sand and ignited. Although the reaction itself is very rapid, extensive time must be devoted to cooling of the massive ingot of ferromolybdenum produced. Following the separation of the slag cap, the ferromolybdenum is broken up into pieces of the appropriate size. The whole process is labour intensive, and accompanied by a great evolution of dust, smoke and heat. Plasma technology, on the other hand, offers the possibility of carrying out the same operation in a single step, according to the equation:

$$MoS_2 = Mo + S_2$$

The molybdenum thus produced can be then added to the required amount of iron, to yield the final ferromolybdenum product of the desired Mo content. It should be noted that the sulphur is evolved as a vapour in its elemental form, and can therefore be collected and condensed separately, without the creation of pollution problems. It has been shown in an article entitled "The Decomposition Kinetic of Molybdenite in an Argon Plasma" by R. J. Munz and W. H. Gauvin (published in AIChEJ., Volume 21, No. 6, pages 1132–1142, 1975) that the higher the temperature of the reaction, the faster will be its reaction rate. However, the industrial specifications for the sulphur content of ferromolybdenum to be used in steel making (its principal application) are extremely stringent. No more than 0.15% of sulphur must be present in the product. This means that the reaction must be 99.9% complete, otherwise the sulphur remaining in the product will exceed its specification. The specification for carbon content is equally rigid. Finally, a plasma reactor capable of yielding directly molybdenum or ferromolybdenum in the molten state is much to be preferred to one that yields molybdenum powder.

In the search for a new plasma process, the published scientific and patent literature was critically examined and many experimental laboratory tests were performed. All systems involving the contact of a powder concentrate with a plasma flame had to be rejected on two counts: either the contact time between the powder and the entraining plasma flame was too short (only a few milliseconds are available) to drive the reaction to completion, or part of the powder escaped the hot zone of the plasma and was either incompletely treated or not treated at all. It must be realized that a 99.9% conversion means that only one out of one thousand particles is allowed to go untreated. Similarly, inductive and capacitance plasmas had to be rejected because of the low efficiency in producing the high frequency field (typically 4 MHz) required for the formation of the plasma. About 30% of the energy at the busbar is lost in the oscillators which produce the high frequency current. A summary of the unsuccessful experiments which were carried out with a variety of plasma generating devices can be found in a publication by G. R. Kubanek, R. J. Munz and W. H. Gauvin, "Plasma Decomposition of Molybdenum Disulphide", Proceedings of Third International Symposium on Plasma Chemistry, Limoges, France, 1977.

In view of the results of the above work, it was decided that a plasma reactor system with the arc transferred to a melt should be developed to meet the requirements for energy efficiency, product purity, etc. Various dc arc systems have been previously proposed and developed for processing powder feed in the molten form. Notable among these are:

a. The expanded precessive plasma system (as disclosed by J. K. Tylko in U.S. Pat. Nos. 3,932,171 and 4,154,972, and other related patents), in which the arc is transferred from a cathode rotating about a central axis to a molten bath, with fine particles fed in a rain downward around the cathode. A potential application is the production of ferrochrome from chromite.

b. The hot wall continuous plasma reactor (J. F. Skrivan and J. D. Chase, U.S. Pat. No. 3,856,918) consisting of a conventional dc plasma torch whose hot gas issues into the top of a cylindrical reactor. Fine particles (titaniferous ores) are fed pneumatically just below the top of the reactor at an angle of about 45° to impinge on and flow down the wall, and react with the reducing gas. The product drips off into a crucible below.

c. The falling-film plasma reactor (D. R. MacRae et al. U.S. Pat. No. 4,002,466 and Canadian Pat. No. 1,065,794) consisting of a top cathode and cylindrical wall anode, with solid particles fed pneumatically and tangentially near the top of the anode thus forming a molten falling-film on the inside surface of the anode. The arc strikes this film randomly at spots offering the least electrical resistance. Thus, this film, if continuous, protects the anode, decreasing its rate of erosion, and acting as a thermal insulator to decrease the heat loss to the cooling water. The melt then falls into a crucible from which it is tapped off.

The latter falling-film dc transferred-arc plasma reactor system was found to be the most promising. The system has been applied to iron ore reduction with carbonaceous solid reductant and a mixture of methane and hydrogen in the gas. Other applications include the production of ferrovanadium by the carbothermic reduction of vanadium oxides disclosed in a paper entitled "Ferrovanadium Production by Plasma Carbothermic Reduction of Vanadium Oxide" by D. R. MacRae, R. G. Gold, C. D. Thompson and W. R. Sandall, Proceedings of Third International Symposium on Plasma Chemistry, Limoges, France, 1977, and the production of molybdenum from molybdenum disulphide as disclosed by D. R. MacRae and R. G. Gold in U.S. Pat. No. 4,234,334. In the latter patent, it is stated that the initially non-conducting film of $MoS_2$ caused the arc to short circuit between the cathode and an uncovered portion of the anode. This problem was circumvented by the addition of a conductive material (preferably carbon) to the feed. It is to be noted that the material in the crucible is heated solely by convective heat transfer from the hot effluent gases flowing over its surface. A close study of this patent shows that the process, as described, is undesirable for industrial applications with stringent performance requirements for the following reasons:

1. Addition of carbon to the $MoS_2$ feed is necessary to make the film on the wall electrically conductive. Addition of this carbon results in the formation of molybdenum carbide which is thermodynamically stable and remains as a contaminant in the product, from which it would need to be removed in another high-temperature treatment process, additional to the plasma reactor system.

2. The purity requirements for the product are not satisfied. Not only is the product contaminated with unacceptable levels of carbon, as discussed in the previous paragraph, but its sulphur content is also too high and so is the level of magnesium (as given in the patent Example Three), although the latter may be eliminated by an appropriate choice of crucible material or by fluxing.

3. The system is relatively inefficient in its use of energy. Heavy cooling by means of circulating water is required for the wall anode to protect it from the intense heat generated on it when the electrons in the plasma gas recombine on its surface. Therefore, only part of this energy is used in melting and decomposing the film of $MoS_2$. In addition, the large volumes of cold gas required to convey the feed powder mix with the hot plasma gases resulting in a much lower temperature level in the effluent gases which are used to heat the crucible material. As a result, the effluent gases leave at an intermediate temperature which is not efficiently usable in heating the crucible but, however, constitute a very important heat loss in the whole system.

4. The patent mentions the initial charging of the crucible with an iron melt to yield a master ferromolybdenum alloy as the newly produced molybdenum falls into the crucible mixing with the iron, and the addition of iron powder as the electrically conductive material added to the feed in order to eliminate erosion problem and/or destruction of the anode. However, it should be noted that the iron would combine with the sulphur present in the system to form FeS, which is thermodynamically very stable. This would result in significant sulphur levels in the product, making it technically and economically more difficult to meet the stringent specification for sulphur.

5. While the process is in operation, the anode wall is protected by the falling film of melting $MoS_2$, which absorbs a considerable fraction of the heat generated at the striking arc root. Should be discontimuity in the falling film occur at any time during the process, leaving a small area of the anode wall bare, the arc would preferentially strike at that spot because of its better electrical conductivity and cause this section of the anode to be destroyed, as described in Example Two of the patent by MacRae and Gold. From a safety point of view, such an occurence, which would admit water from the cooling jacket into the system, might cause an explosion by the contact of water with the large quantities of molten metal in the crucible.

The applicants have found through experimental work that many of the drawbacks of the above U.S. Pat. No. 4,234,334 and of the various other systems mentioned in the scientific and patent literature could be overcome by using a novel reactor design comprising a bottom portion forming a crucible for collecting molten material, an anode adapted to contact the molten material in the crucible, a sleeve mounted on top of the crucible and electrically insulated therefrom, a cathode assembly including a cathode mounted on top of the sleeve and electrically insulated therefrom, means for introducing feed material conveyed by a carrier gas near the top of the sleeve so that the material is fed against the inner wall of the sleeve, melted under the heating action of the energy radiated by a plasma arc formed between the cathode and the molten material, to form a falling film of molten material which flows down along the inner wall of the sleeve and drops into the crucible underneath, and outlet ports in the bottom portion of the reactor for exiting the carrier gas and the non-reacted plasma-forming gas.

The cathode is vertically movable for starting the plasma arc by bringing the cathode tip in close proximity to the molten material, and for controlling the plasma arc for optimum operation.

Means are normally provided for cooling the cathode assembly. In a preferred embodiment of the invention, the cold plasma-forming gas may be circulated through the cathode assembly for cooling it.

The sleeve may be cooled with water or other coolants if the temperature level of the reaction requires it.

The bottom portion of the reactor accommodates an anode which consists of an electrically-conducting material inert to the melt. It may require cooling (water, air, oil as required). Generally, cooling of the reactor walls and other components should be minimized or avoided by the use of insulation.

One feature of the invention is that addition of flux for the purpose of refining or slagging of impurities can be made either with the feed material through the sleeve or separately above the melt through a sealable opening in the crucible wall or top. Addition of alloy forming ingredients can also be made either with the feed material through the sleeve or separately above the melt through a sealable opening in the crucible wall or top.

The invention will now be disclosed, by way of example, with reference to the accompanying drawings in which.

Figure 1:
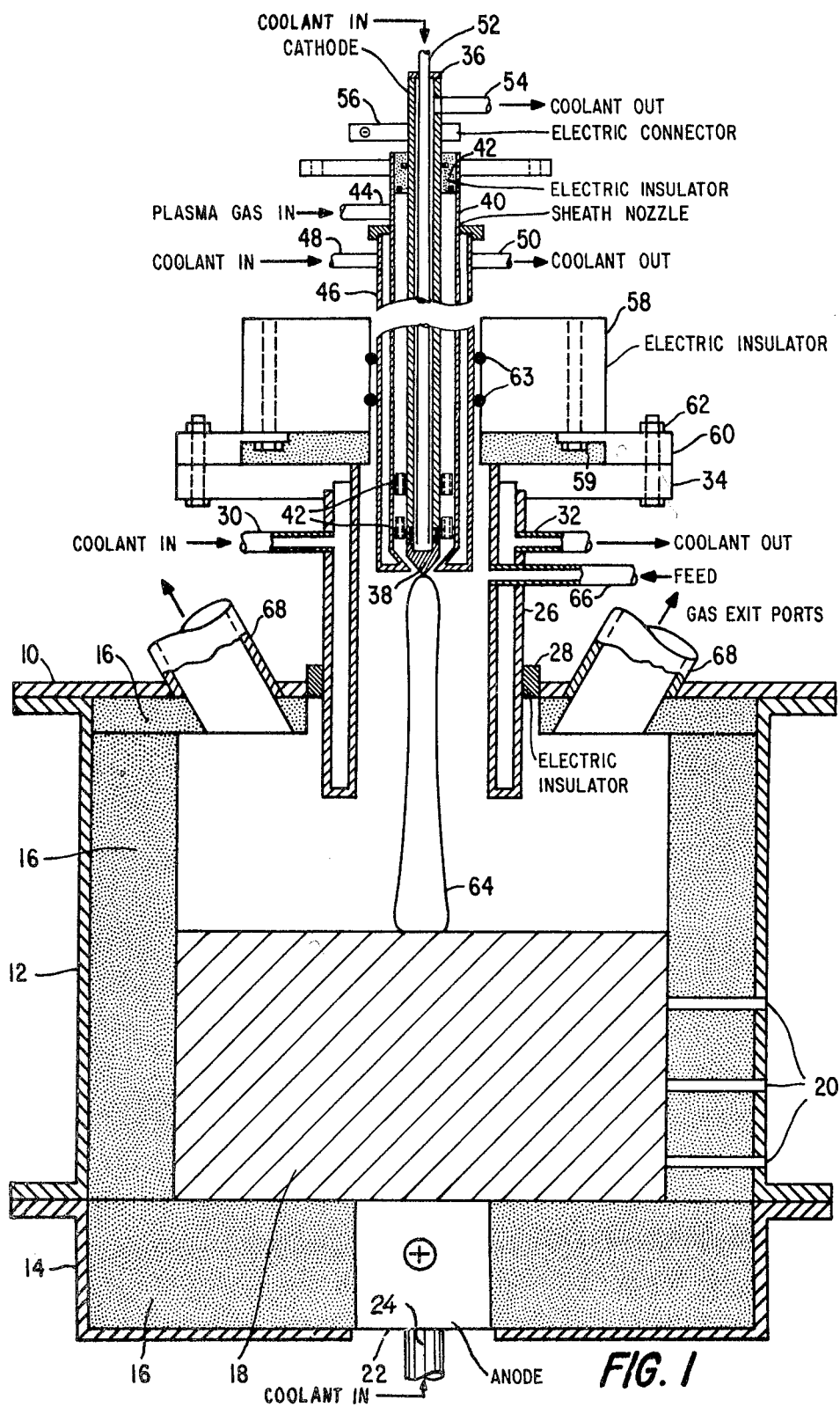
FIG. 1 is a section view through a preferred embodiment of a plasma reactor in accordance with the invention.

Referring to FIG. 1, the novel reactor comprises a bottom portion which is made in three sections for ease of construction and maintenance, namely a top section 10, a central section 12 and a bottom section 14. All three sections are made of metal lined with refractory material 16. The central and bottom sections form a crucible for collecting molten material 18. The central section is provided with ports 20 for the periodic removal of slag and metal products. The bottom section also accommodates a bottom anode 22 which is cooled, if necessary, with water, oil or air fed into inlet tube 24 (outlet not shown) and is adapted for connection to the positive side of a dc current rectifier. The anode is well protected by the melt from direct impingement of the plasma arc. The top section or cover 10 is provided with a central opening into which is mounted a sleeve 26 which is electrically insulated from the cover by means of ring insulator 28. The sleeve 26 is enclosed by two concentric tubes between which water or other coolants are circulated in through inlet 30 and out through outlet 32. The sleeve is preferably made of metal, such as copper or steel, depending on the application. The sleeve 26 could also be a replaceable graphite sleeve in certain applications. Alternatively, an uncooled tubular sleeve could be used in some applications. An annular plate 34 is welded to the top of the sleeve 26 and a cathode assembly is mounted on the annular plate 34. The cathode assembly comprises a cathode 36 at the lower end of which is mounted a replaceable thoriated tungsten cathode tip 38. The cathode is surrounded by a sheath nozzle 40 which is spaced from the cathode by top and bottom electrical insulators 42, and the plasma gas is fed inside the sheath nozzle inlet 44, and to the cathode tip through distributing holes in the lower insulators 42. A cooling jacket 46 is provided around the cathode sheath nozzle for a coolant which is fed in through inlet 48 and out through outlet 50. The cathode tip is also cooled by flowing a coolant in through an inlet 52 and out through an outlet 54. A connector 56 is welded to the cathode for connection to the negative side of a dc current rectifier. Alternatively, other types of cathode could be used with modified sheath nozzle and cooling arrangements, e.g. annular cathode with plasma gas fed inside and outside the annulus, or cavity cathode, with magnetic or gas-flow stabilization of the arc, well known in the art.

The cathode assembly is slidably mounted within an electric insulator 58 which is secured to a ring 60 by means of bolts 59. Ring 60 is secured to annular plate 34 by means of bolts 62. A moving mechanism (not shown) is provided for adjusting the vertical position of the cathode within the sleeve 26 for starting (or restarting) the arc by bringing the cathode tip in close proximity to the anode (molten bath in the crucible) to initiate the plasma column 64 between the cathode and the anode. The length of the plasma column can also be adjusted by moving the cathode up and down for optimum operation. O-rings 63 are provided for sealing the reactor while allowing movement of the cathode assembly.

The feed material is conveyed within the sleeve 26 through a feed inlet 66 by means of a cold carrier gas. The feed material is preferably fed tangentially so that the material is centrifugually-flung against the inner wall of sleeve 26. The material is melted under the heating action of the energy radiated by the plasma column 64 and allowed to flow down along the inner wall of the sleeve 26 and then to drop into the crucible underneath. The electrons generated at the cathode and also in the plasma column, are neutralized at the surface of the molten bath 18, thereby releasing their considerable heat of recombination and heating the molten bath 18. The cold carrier gas in which the powdered feed material is entrained flows down in the annular space between the sleeve and the plasma column, with only some of it entrained within the latter. The carrier gas is heated to a certain extent by convective heat transfer in contact with the molten film on the surface of sleeve 26, but not by radiation from the plasma column since its absorptivity for radiation is negligibly small. In other words, it is transparent to radiation. In general, the carrier gas emerging from the sleeve is at a temperature much lower than that of the plasma column. It then proceeds to flow towards exit ports 68 and because of its relatively low temperature it effectively cools the upper parts of the reactor, the back of sleeve 26 and the roof of the reactor, and it helps prevent exit ports 68 from overheating.

Figure 2:
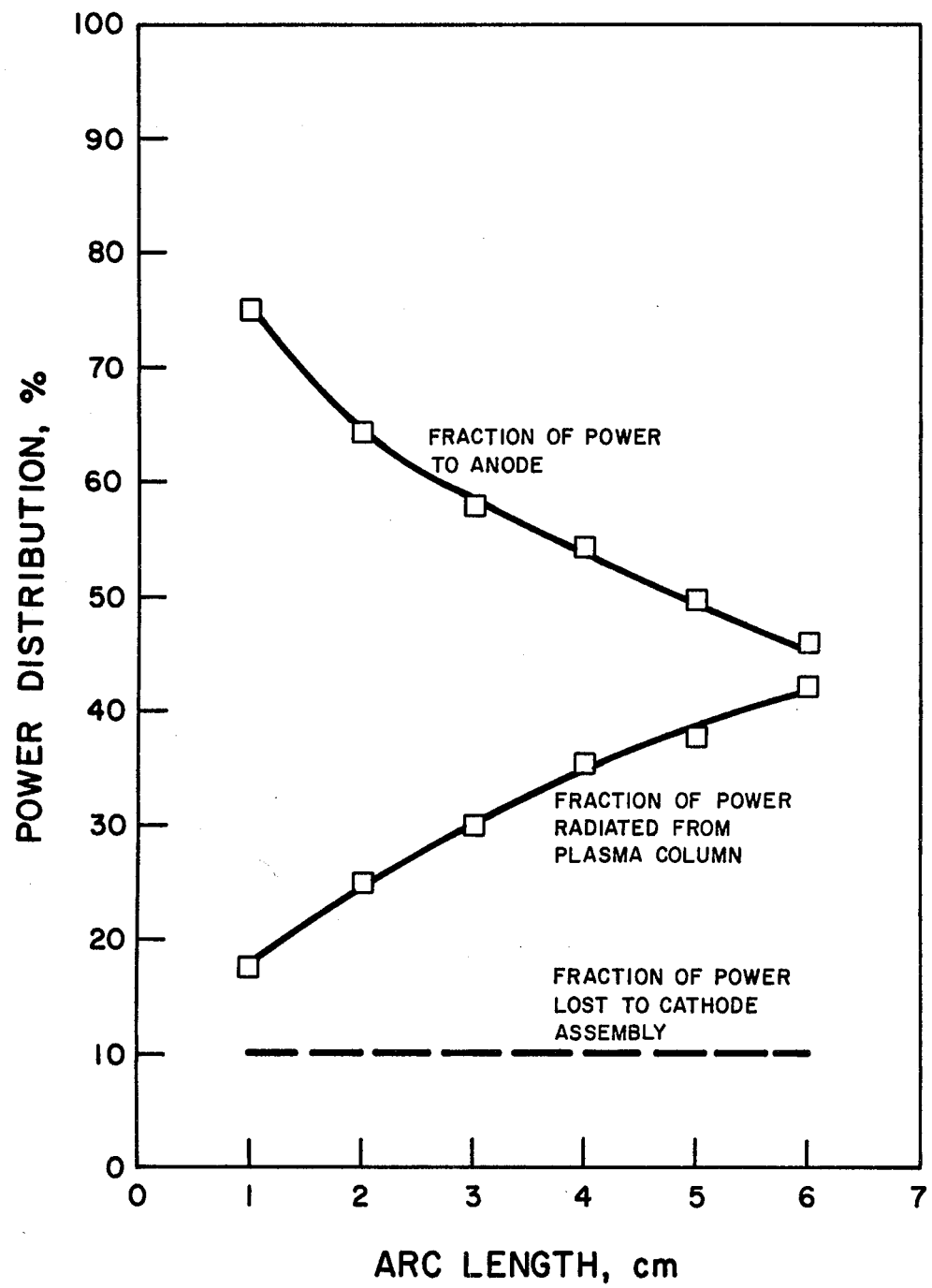
FIGS. 2 and 3 illustrate the power distribution of energy which has been measured in the reactor with argon and nitrogen plasmas.
Figure 3:
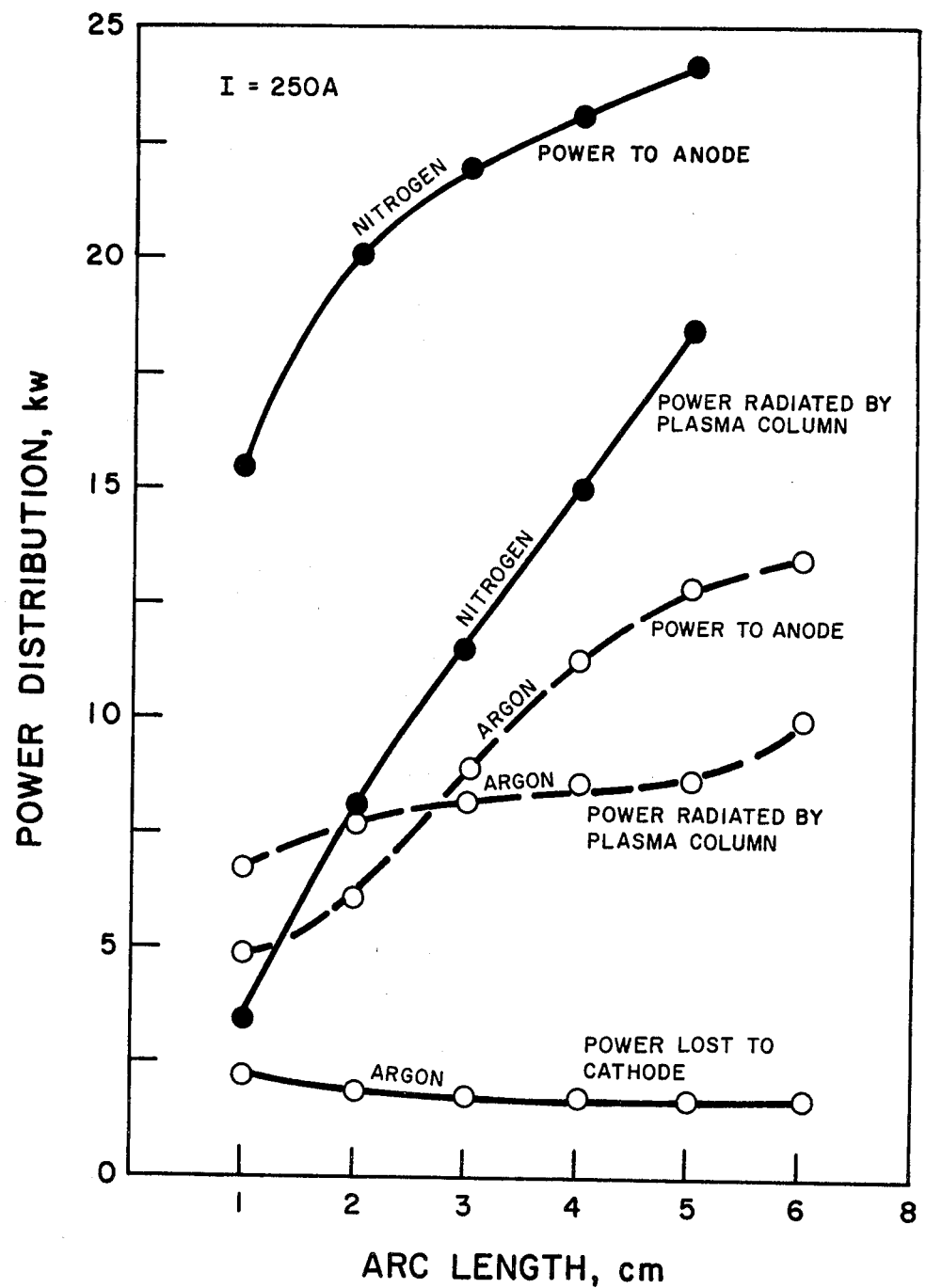

The overriding importance of using the electrical energy supplied to the system with maximum efficiency has been stressed earlier. FIG. 2 illustrates the power distribution in percentage which has been measured, at various arc lengths, in a reactor of the type disclosed above at currents of 150–350 amp with a nitrogen plasma, while FIG. 3 illustrates the power distribution in kW for various arc lengths, at a current of 350 amp, with nitrogen and argon plasmas.

It is noticed that a major part of the energy supplied to the plasma goes to the falling film of material being processed by radiation from the plasma column and to the molten material in the crucible through electron recombination, and that only a small part is lost in the cathode assembly. Thus most of the energy supplied is usefully utilized. Three unavoidable sources of heat losses still exist: the first heat loss is experienced to cool the sleeve and cathode assembly; the second is the heat loss to the effluent gases; the third is the heat loss through the walls of the reactor to the surroundings. Concerning the first, it is noticed from FIG. 2 that the heat removed to keep the cathode assembly cool accounts for less than 10% of the total energy supplied. It has been shown to be almost constant for a variety of operating conditions (arc length, current, plasma gas flow rate). It has been shown experimentally that part of this heat can be recovered by using the cold plasma forming gas as the cooling medium for the cathode assembly, rather than cooling with water or oil. It has also been found that it is the velocity rather than the volumetric flowrate of this gas which is important for the protective cooling of the cathode tip and determines the life of the cathode. Heat losses through the walls and the roof of the reactor and crucible can be minimized by elimination of water cooling in these sections, and by the use of heavy insulation.

Finally, the heat loss in the effluent gas is comparatively small, because of its relatively low temperature level and of its small heat capacity.

It has been shown experimentally that the best operation is obtained when the crucible is tapped intermittently. For example, for a crucible capable of holding sufficient product resulting from eight hours of operation, tapping of its contents should be effected every four hours, during which approximately half of the charge can be removed. Should the material being treated be of such a nature that a slag layer should be formed on top of the molten product, this can be easily removed through the top tap hole 20. Product free from slag can be removed through the lower two tap holes 20, or by tapping through the bottom of the crucible.

Operation need not be interrupted during tapping of the product from the crucible. Feeding of the raw material can proceed as before, which will result in a lengthening of the plasma column 64 as the level of molten metal 18 in the crucible is lowered. Alternatively, the cathode assembly which is attached to a moving mechanism (not shown) can be moved downward in the sleeve 26 so that the length of the plasma column does not become excessive.

Refractory contamination of the product in the crucible may be avoided by the provision of a salamander or layer of frozen product along the walls and bottom of the crucible.

Stirring of the bath for larger reactors can be provided by multiple anodes and/or magnetic stirring. The latter method is well known in the art.

There are some applications in which this plasma reactor provides unique operational flexibility with respect to the addition of reactants. This is best illustrated by the case of molybdenite decomposition to molybdenum:

a. Without the addition of carbon, complete desulphurization can be achieved by shutting off the powdered feed prior to tapping off product while maintaining the arc whose energy is dissipated in the melt where it is needed. The fraction of energy dissipated in the melt may be increased further by lowering the cathode. The product can then be tapped off as molybdenum, or can be treated further in a separate refining furnace with the addition of iron to produce ferromolybdenum.

b. With the addition of carbon, desulphurization to low sulphur levels is favoured at the expense of carbon contamination. Carbon plus remaining sulphur can be eliminated in a separate refining furnace to produce molybdenum or, alternatively, with the addition of iron in a refining furnace to produce ferromolybdenum.

A number of applications have been studied in this plasma system. The following are three examples on the production of molybdenum, ferrovanadium and ferrocolumbium, respectively.

EXAMPLE 1: MOLYBDENUM PRODUCTION a. Molybdenite concentrate (54.5% Mo, 39% S) was fed into a plasma reactor of the type disclosed above to form a falling-film (typically 2.5 mm thick) on the inner wall of a sleeve (38 mm i.d.) at a power level of 22 kW, with a plasma gas of nitrogen and an arc length of 11 cm. No carbon was added. Chemical analysis of the final product obtained following solidification and heat treatment without feed is shown in the following Table. It is important to note that considerable elimination of impurities (lead, antimony, bismuth, copper, phosphorus, etc.) occurred, in addition to the removal of sulphur.

TABLE I

| ELIMINATION OF MINOR ELEMENTS FROM MOLYBDENITE | | | | | | | | |
|---|---|---|---|---|---|---|---|---|
| | Mo | S | Pb | Sb | Bi | Cu | P | As |
| Molybdenite, % | 54.5 | 39 | 0.020 | 0.08 | 0.0042 | 0.288 | 0.01 | 0.018 |
| Molybdenum Product, % | 98.0 | 0.14 | 0.0057 | 0.021 | 0.0026 | 0.0287 | 0.003 | 0.025 |
| Removal, % | — | 99.9 | 84 | 85 | 66 | 94 | 83 | 23 | b. Molybdenite concentrate was fed continuously into a plasma reactor of the type disclosed above with a sleeve and crucible lined with graphite to form a falling-film, at a power level of 24 kW using argon plasma gas and an arc length of 18 cm. The product contained 94.2% Mo, 2.8% S and 2.95% C. In a similar test with nitrogen at 38.5 kW the product contained 92.5% Mo, 0.24% S and 4.6% C. The carbon content originated from the lining of the sleeve and crucible; carbon is therefore undesirable as a material of construction in this application.

c. Molybdenite concentrate plus 8% added carbon by weight was fed continuously into a plasma reactor of the type disclosed above with a sleeve and crucible both lined with graphite to form a falling film, at a power level of 37 kW using nitrogen as plasma gas and an arc length of 12 cm. The product contained 92.1% Mo, 0.085% S and 6.7% C.

It is important to note that, in the latter example, carbon was not added for the purpose of making the feed material electrically conductive, as was needed in the teaching of MacRae and Gold previously cited, but to promote the final removal of sulphur by the displacement reaction: $MoS_2 + C \rightarrow MoC + S_2$.

In examples b and c above, removal of the carbon in the product can be effected in a separate vessel, by means of addition of mill scale or iron oxide, in a process well known in the art.

EXAMPLE 2: FERROVANADIUM PRODUCTION

Vanadium pentoxide (99%) was charged to the plasma reactor and treated at 17 kW using argon and nitrogen plasma gas and an arc length of 5.5 cm with iron and carbon. The product contained 79.4% V, 18% Fe and 0.6% C. This product was therefore very close to the target of 80% ferrovanadium set for this high-grade alloy.

EXAMPLE 3: FERRONIOBIUM PRODUCTION

Pyrochlore (62% $Nb_2O_5$, 3% $SiO_2$, 3% $TiO_2$, 13% CaO, 6% $Na_2O$ plus $K_2O$) was charged to the plasma reactor and treated at 22 kW using argon and nitrogen plasma gas and an arc length of 7 cm with iron and carbon. The product contained 43% Nb, 46% Fe and 2.6% C, and the inert ingredients formed a slag.

In examples 2 and 3, it is again emphasized that carbon was added solely for the purpose of metallurgical reduction.

The most important features of the plasma reactor disclosed above may be summarized as follows:

1. The major part of the energy supplied to the plasma gas goes to the falling film of material being processed by radiation from the plasma column and to the molten material in the crucible through electron recombination. Reduction of the heat loss is done by avoiding cooling the crucible whenever possible through the use of heavy insulation (consistant with maintaining the crucible refractory at a temperature compatible with the melt temperature), by using the cold plasma forming gas as the cooling medium for the cathode assembly, and by using the cold carrier gas to help cooling the back of the sleeve and the roof of the reactor. The heat loss in the effluent gas is also small because it is only heated to a certain extent by convective heat transfer in contact with the molten film on the surface of the sleeve, but not by radiation from the plasma column since its absorptivity for radiation is negligibly small.

2. In the plasma design in accordance with the invention, unlike that of U.S. Pat. No. 4,234,334, there is no need to add an electrically-conductive material such as carbon to the feed for the purpose of maintaining a conductive falling film and thus preventing failure of the anode since it is the melt in the crucible that effectively conducts the current and is in electrical contact with the anode. On the other hand, carbon may be added as a reactant to effect carbometric reduction, when required.

3. Another important feature of the invention is the use of a movable cathode. This provides for very easy starting (or restarting) of the arc by bringing the cathode tip in close proximity to the anode. It also provides for the adjustment of the arc length for optimum operation, i.e. changing the relative distribution of energy to the melt and falling film. Finally, it permits adjustment of the arc length according to the molten bath level.

4. Stability of the arc and of the plasma column it creates is provided by the strong centrifugal action of the carrier gas within the sleeve.

5. A very high residence time to permit the reaction to go to completion is provided by the high capacity of the crucible. Reaction is expedited by the large amount of heat released at the anode arc root. This feature can be put to good use for the purpose of carrying out further reaction after the feed is stopped.

In addition to the above features, the plasma reactor in accordance with the invention also has the following additional features:

1. The reactor design is gas tight. This design ensures maintenance of a controlled atmosphere within the reactor, with no air contamination.

2. The reactor also provides good working conditions: low noise level; no excessive heat in the working area; no dust.

3. The reactor design is quite safe. Water leaks tend to extinguish the arc.

Figure 4:
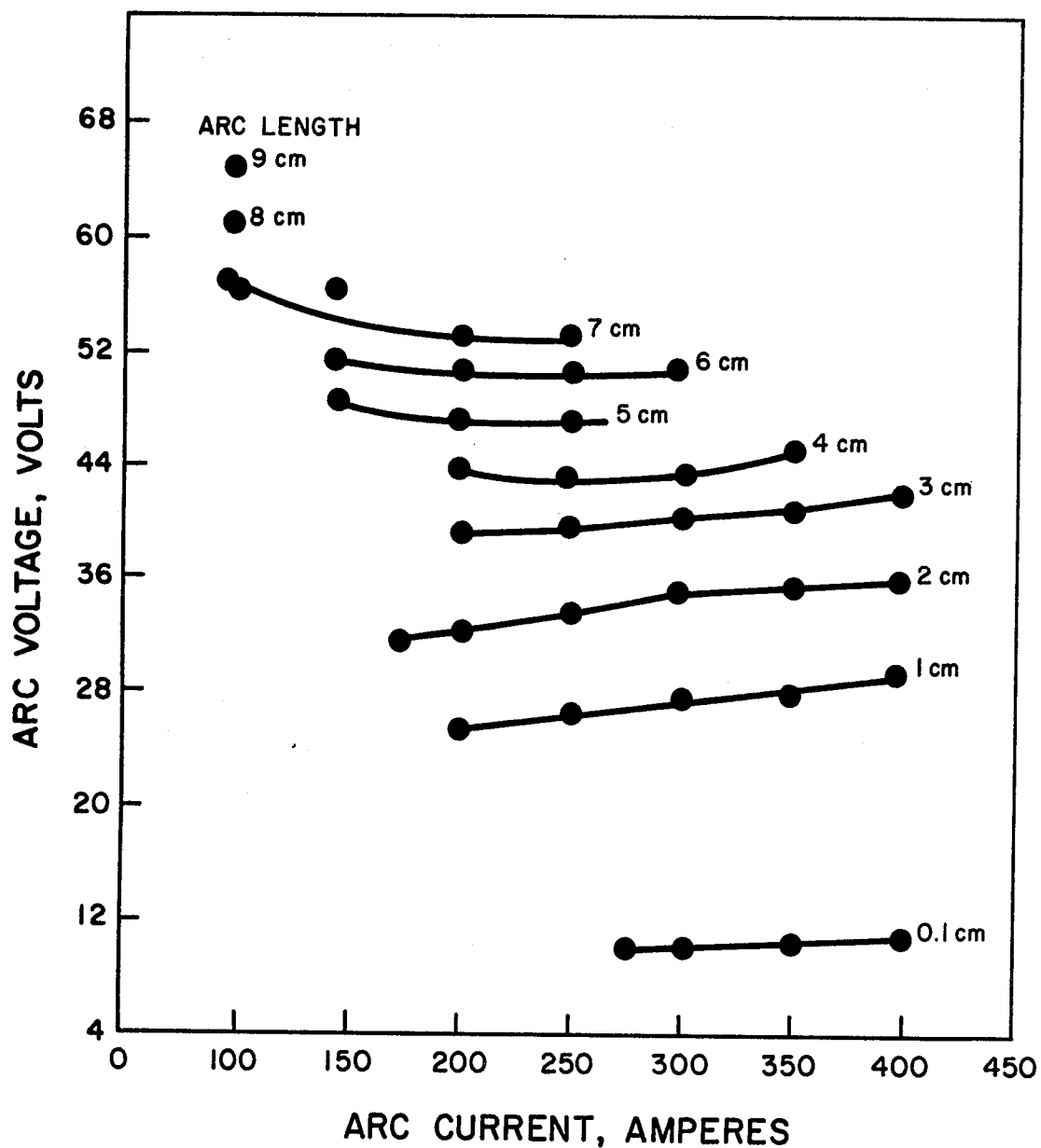
FIGS. 4 and 5 illustrate the voltage-current characteristics of the reactor in accordance with the invention, using argon and nitrogen plasmas.
Figure 5:
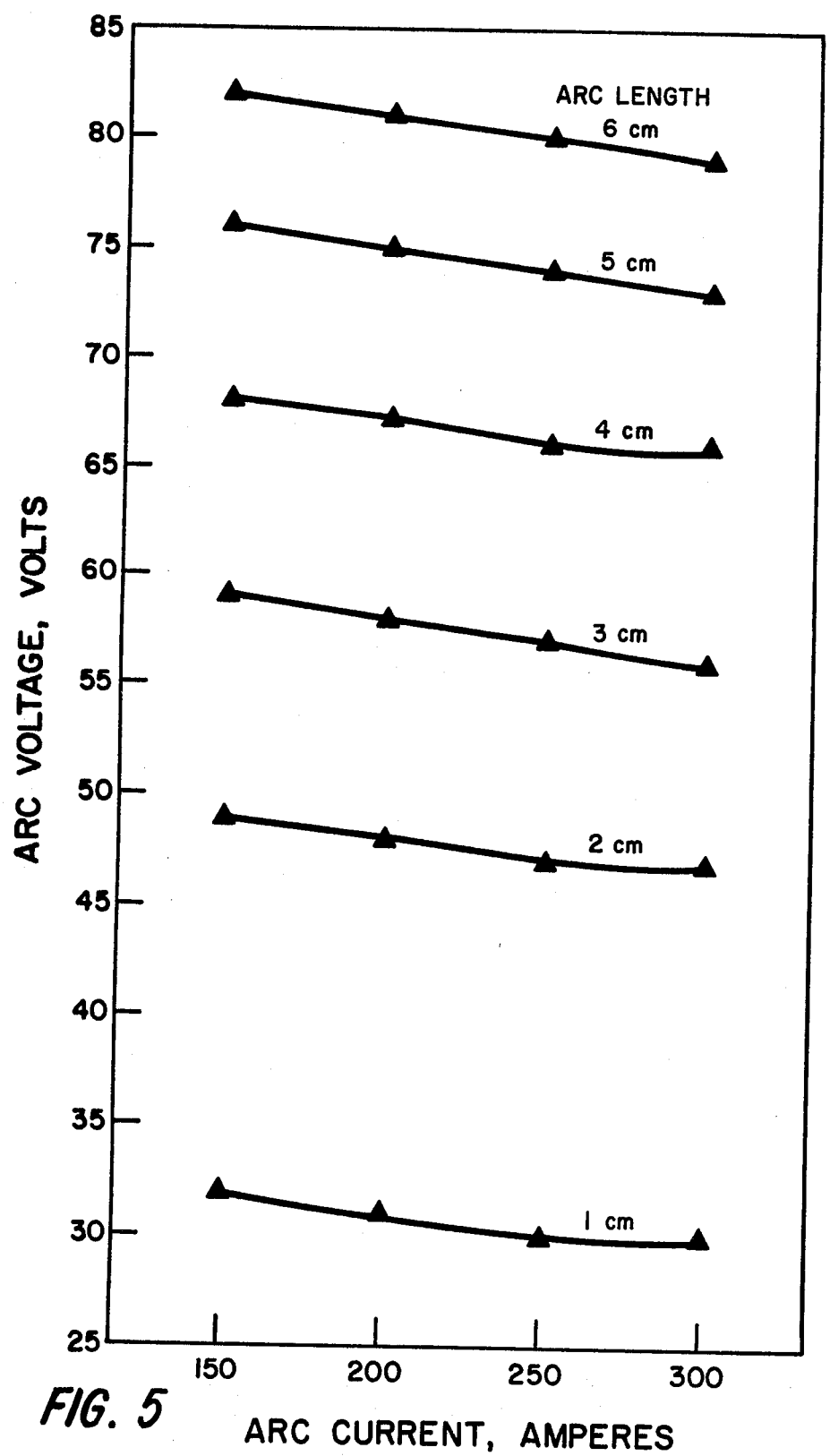

4. There is considerable flexibility as to the choice of plasma-forming gas: argon and nitrogen have been both thoroughly studied and their voltage-current characteristics for various arc lengths have been determined, as shown in FIG. 4 for argon plasma and FIG. 5 for nitrogen plasma. Hydrogen can be used if a reducing atmosphere is required. It also provides a flame with a very large energy content. Methane and carbon monoxide can also be used if reducing conditions are required. Similarly, it has also been shown that a plasma of chlorine gas can be used to produce a chloride compound, for example, to convert $ZrO_2$ to $ZrCl_4$ (O. Biceroglu and W. H. Gauvin, "Chlorination Kinetic of $ZrO_2$ in an R. F. Plasma Flame", paper presented at the Fourth International Symposium on Plasma Chemistry, Zurich, Switzerland, August 1979).

5. Because of the simplicity of construction, design parameters can be easily established for scaling up of the reactor, for any power requirements. For example, it has been experimentally established that as the current increases, the voltage gradient by unit length of the flame column attains a steady value. Thus very high currents, and hence very high powers can be sustained by the plasma column.

6. The design eliminates most or part of the volatile impurities in the feed materials. Thus, in the production of molybdenum, magnesium, sodium and potassium are totally eliminated. Copper, lead, zinc, arsenic, phosphorus, bismuth and antimony impurities are greatly reduced. Thus, a feed containing high percentages of impurities can be upgraded to yield a product of acceptable quality.

7. The reactor can also be used for remelting and upgrading operations, or for the treatment, at low additional energy cost, of a stream of molten metal for elimination of volatile impurities.

8. Addition of flux for the purpose of refining and slagging of impurities can be made either with powdered feed through the sleeve inlet 66 or separately above the melt through a sealable opening in the crucible wall or roof.

9. Addition of iron or other alloy-forming ingredient can also be made either with the powdered feed through the sleeve inlet 66 or separately above the melt through a sealable opening in the crucible wall. Alternatively, in cases where it is thermodynamically disadvantageous to add iron to the plasma reactor, e.g., with sulphur present, it should be done in an external furnace which can also be used for additional refining.

The plasma reactor in accordance with the invention could advantageously be used in a process flowsheet for the production of ferromolybdenum or molybdenum as disclosed by W. H. Gauvin, G. R. Kubanek and G. A. Irons in an article entitled "The Plasma Production of Ferromolybdenum-Process Development and Economics" Journal of Metals, Volume 23, No. 1, Pages 42–46, January 1981, or in the production of other ferroalloys and metals.

We claim:

1. A transferred-arc plasma reactor for chemical and metallurgical applications comprising:
   (a) a bottom portion defining a crucible for collecting molten material;
   (b) an anode mounted in the crucible and adapted to contact the molten material in the crucible;
   (c) a sleeve mounted on the top of said crucible and electrically insulated therefrom and thus from the anode which is mounted in the crucible;
   (d) a cathode assembly including a cathode mounted on top of said sleeve and electrically insulated therefrom;
   (e) means for introducing feed material conveyed by a carrier gas near the top of said sleeve so that the feed material is fed against the inner wall of the sleeve, melting under the heating energy radiated by a plasma column formed between the cathode and the anode via the molten material in the crucible to form a falling film of molten material which flows down along the inner wall of the sleeve and drops into the crucible underneath;
   (f) exit ports in the bottom portion of the reactor for exiting the plasma and carrier gases; and
   (g) means for tapping the molten material from the crucible.

2. A plasma reactor as defined in claim 1, wherein said cathode is vertically movable for starting the plasma arc by bringing the cathode tip in close proximity to the molten material and for adjusting the length of the arc for optimum operation.

3. A plasma reactor as defined in claim 1 or 2, further comprising means for cooling said cathode assembly.

4. A plasma reactor as defined in claim 1 or 2, further comprising means for cooling said sleeve.

5. A plasma reactor as defined in claim 1, wherein said means for tapping the molten material from the crucible includes several tapping ports provided in the bottom portion of the reactor for periodic removal of the molten product from the crucible.

6. A plasma reactor as defined in claim 1, further comprising means for cooling said anode.

7. A plasma reactor as defined in claim 1, further comprising means for cooling said crucible.

8. A plasma reactor as defined in claim 7, wherein said crucible is made of refractory material forming a heavy insulation so that minimum or no additional cooling is necessary.

9. A plasma reactor as defined in claim 1, wherein said sleeve is made of metal.

10. A plasma reactor as defined in claim 9, wherein said sleeve is lined with refractory material.

* * * * *